March 29, 1960    J. J. PIROS    2,930,578
VALVE APPARATUS ESPECIALLY FOR PRESSURIZED FLUIDS
Filed July 16, 1954    2 Sheets-Sheet 1

INVENTOR.
John J. Piros
BY
Adams, Forward and McLean
ATTORNEYS

March 29, 1960 J. J. PIROS 2,930,578
VALVE APPARATUS ESPECIALLY FOR PRESSURIZED FLUIDS
Filed July 16, 1954 2 Sheets-Sheet 2
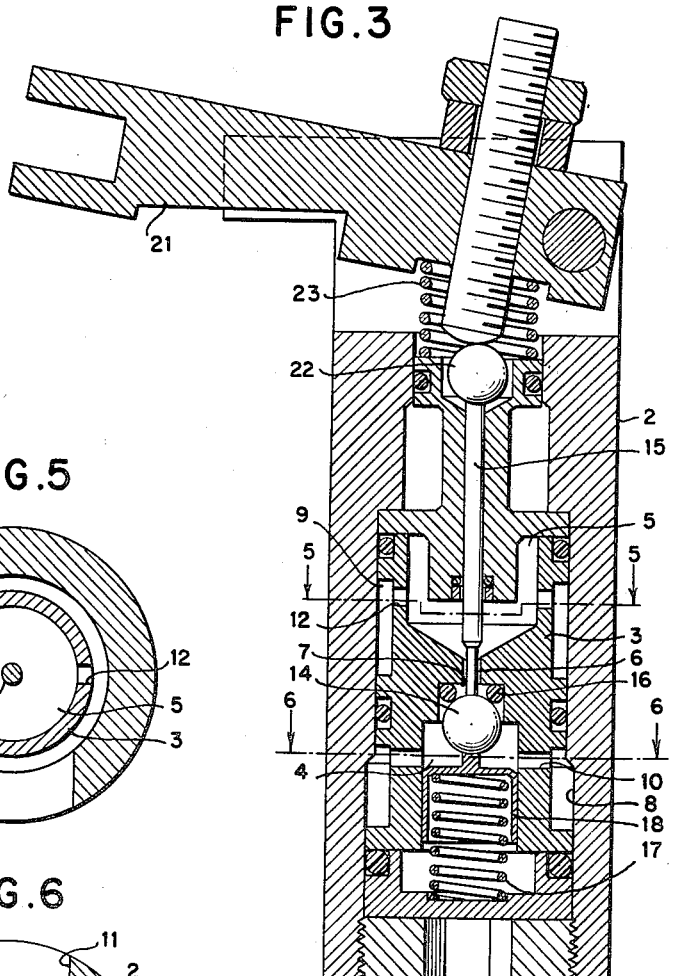
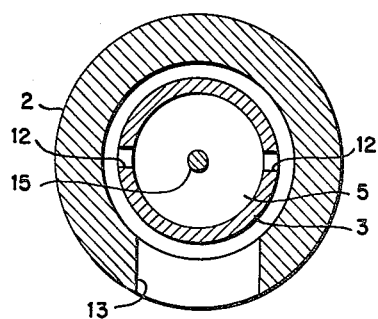
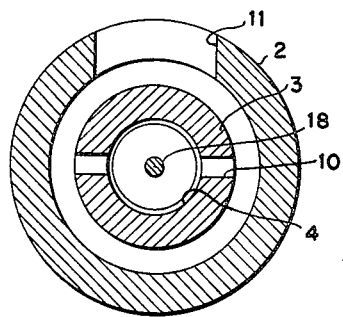
INVENTOR.
John J. Piros
BY
Adams, Forward and McLean
ATTORNEYS

United States Patent Office 2,930,578
Patented Mar. 29, 1960

2,930,578

VALVE APPARATUS ESPECIALLY FOR PRESSURIZED FLUIDS

John J. Piros, Homewood, Ill., assignor to Sinclair Refining Company, New York, N.Y., a corporation of Maine Application July 16, 1954, Serial No. 443,815

2 Claims. (Cl. 251—332)

My invention relates to the regulation of the flow of fluids under high pressure. My invention, in particular, is a valving mechanism specifically designed for the control of light liquids of low viscosity and of gases which are flowing at low rates and under high superatmospheric pressures.

The regulation of fluid flow at high pressures—at best a difficult problem—requires carefully mated valves and valve seats which operate to provide a mechanically tight metal-to-metal closure. I have found, however, that the flow of relatively non-viscous fluids, such as gases and light-bodied liquids, often is not effectively regulated by metal-to-metal valve closures when low flow rates and extremely high pressure conditions exist. The inadequacy of simple metal-to-metal valve closures under such conditions, which may also be aggravated by the presence of entrained or suspended solid particles, is an extremely important problem in the design of automatic or remotely operated valves, such as solenoid actuated valves, for high pressure service in the control of light liquid and gas flow. In bench scale tests of reforming catalysts, for example, where reformate is withdrawn under pressures of the order of 1,000 p.s.i. and at rates of 100 ml. per hour, an excellent, commercially available, solenoid actuated valve of dual port design employing metal-to-metal sealing surfaces permitted a leak-through in closed position comparable to the total volume of the liquid product handled.

I have invented a valving mechanism, particularly designed for actuation by energization of a solenoid, which is free of leak-through even when regulating flow of relatively non-viscous fluids at low flow rates and under high pressures. The valving mechanism of my invention is furthermore capable of simple but durable construction and has high resistance to wear even when employed in valving fluids containing entrained or suspended solid particles, such as catalyst fines.

My invention in its broadest aspect is a valving mechanism including a valve port set in a metal valve body, a tapered metal valve and a non-metallic, resilient ring circumferentially retained about the port and having an inner diameter exceeding that of the port. The taper of the valve is such that the valve makes a metal-to-metal closure with the port through the open center of the resilient ring while at the same time the valve exerts substantial pressure on the resilient ring forcing it to compress about the valve and within the circumferential retainer of the ring.

Thus, the pressure of the valve exerted against the ring and the pressure of the liquid behind the valve force the ring into tight sealing contact about the valve and the valve port, thereby effectively preventing any leakage of fluid. At the same time, the resilient ring is prevented from extruding past the valve by the metal-to-metal closure between the valve and the valve port.

The drawings illustrate more clearly the mode of operation of my invention and describe a particular solenoid actuated valving mechanism according to my invention.

In the drawings,

Figure 3 is a section of the valve assembly taken along line 3—3 in Figure 2 while the valve is in the open position.

Figure 5 is a cross section of the valve assembly taken at line 5—5 in Figure 3.

Figure 6 is a cross section of the valve assembly taken at line 6—6 in Figure 3.

Figure 2:
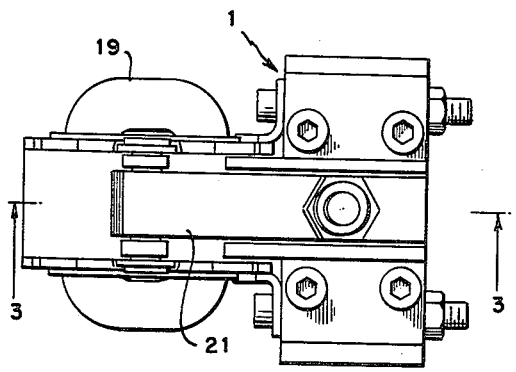
Figure 2 is a top view of the same valve assembly.

In the drawings the reference numeral 1 indicates the completely assembled solenoid actuated valve. The valving mechanism, more clearly shown in Figures 3–6, is contained by valve housing 2 which is chambered throughout its length. Metal valve body 3 is positioned centrally within housing 2 dividing the interior thereof into an inlet chamber 4 and an outlet chamber 5. Valve port 6 intercommunicates inlet chamber 4 and outlet chamber 5 and opens into inlet chamber 4 at opening 7. Valve body 3 is suitably shaped to form a pair of annular chambers 8 and 9 between it and housing 2. Chamber 8 communicates with inlet chamber 4 by ports 10 and communicates with the exterior of valve assembly 1 by port 11 (see Figure 6). Annular chamber 9 communicates with outlet chamber 5 by ports 12 and communicates with the exterior of valve assembly 1 by port 13 (see Figure 5).

The operating assembly of the valving mechanism includes a tapered, metal valve 14 located in a recess in inlet chamber 4 having a smooth face. In the illustration shown in the drawings valve 14 is a spherical ball, although other variations and modifications in the shape of the valve element, some of which are later discussed, will, of course, be readily apparent. The moving parts of the valve assembly also include a pin 15 which passes downwardly from the upper part of valve assembly 1 through outlet chamber 5 and port 6. Pin 15 at its lower extremity bears against valve 14. Non-metallic resilient ring 16 is circumferentially retained about opening 7, interposed between valve 14 and port 6. Resilient ring 16 is made of tough durable materials such as aromatics resistant Buna N rubber or Teflon. The inner diameter of ring 16 exceeds that of port 6 at opening 7 when the ring is compressed between the valve 14 and the smooth face of the recess whereby upon engagement of the valve sphere and face, the valve sphere, ring and face define an unoccupied space to preclude pinching of the ring in the closed position of the valve. Also when viewed in cross-section as in Fig. 4, the ring has a free dimension parallel to the plane of the face greater than that of the space between the valve sphere 14 and the circumferential wall of the recess, that is, greater than one-half the difference in the diameters of the sphere and recess.

Coil spring 17 located in the lower part of valve assembly 1 urges spring guide 18 into bearing contact against valve 14 thus tending to force valve 14 into contact with ring 16 and valve body 3 at port 6 to form a chamber defined by the circumferential wall and face of the recess and the valve sphere 14. Pin 15 is so designed that it may move downwardly against valve 14 a sufficient distance to lift valve 14 from opening 7 and from ring 16 in its uncompressed or free state to permit the flow of fluid from inlet chamber 4 to outlet chamber 5.

Pin 15 is actuated to open valve 14 by the energization of solenoid 19 through the mechanical linkage of solenoid core 20, crank 21 and bearing 22. Spring 23 is employed to release the action of solenoid 19 when de-energized and close the valve. The action of spring 17 by means of spring guide 18 thus forces valve 14 to bear against opening 7 in metal-to-metal closure through the central opening of ring 16. At the same time valve 14 tends to compress ring 16 since the ring is confined circumferentially by valve body 3. When high pressure fluid is present in inlet chamber 4, the pressure of the fluid also tends to compress ring 16 and thus enhances the sealing action of valve 14 and further prevents leakage through port 6 into outlet 5.

Figure 4:
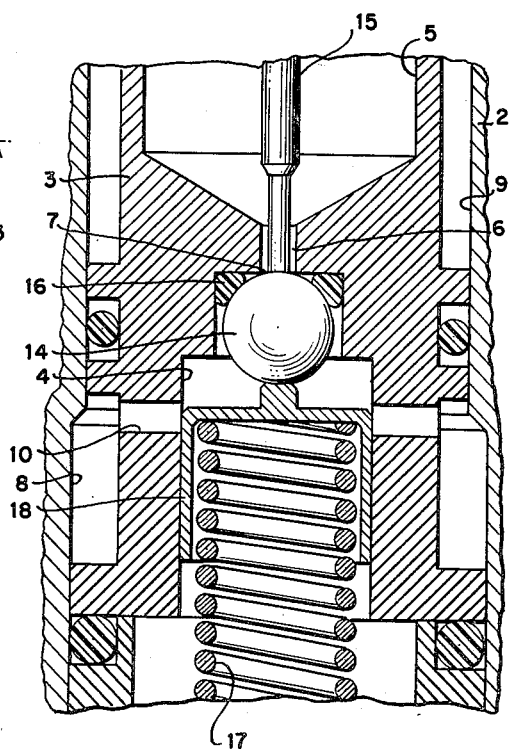
Figure 4 is a partial section along the same line as Figure 3 showing the position of the valving mechanism when the valve is closed.
Figure 1:
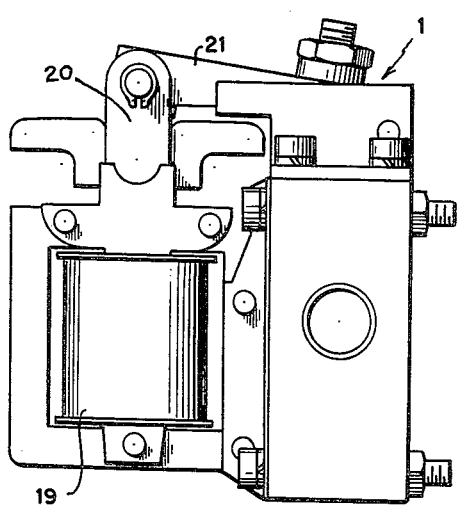
Figure 1 is a side elevation of a solenoid actuated valve assembly according to my invention.

The closed position of the valve is illustrated in Figure 4. It will be seen that the metal-to-metal contact between valve 14 and opening 7 completely prevents extrusion of resilient ring 16. In the open position of the valve, shown in Figure 3, solenoid 19 by means of crank 21 and bearing 22 forces pin 15 downwardly against valve 14 and compresses coil spring 17 so as to provide clearance between valve 14, opening 7 and resilient ring 16.

Although I have shown the operation of my invention in connection with a solenoid actuated valve, it will be obvious that other means of actuation may be employed, either manual or automatic. The action of the valve, however, is more particularly designed for automatic and remote operation. It will be further observed that although I have shown valve 14 as a metal ball any suitably shaped valve element may be employed which provides the necessary tapered face to permit metal-to-metal sealing contact between valve 14 and opening 7 of port 6 through the central opening of ring 16 and yet provides suitable pressure against ring 16 to obtain the benefits of a resilient seal. I have found, for example, that valve 14 and spring guide 18 may be made as a unit in the shape of a cylindrical element having a conical valve end.

Other modifications of my invention will, of course, be apparent to those skilled in the art and I do not intend that my invention shall be limited to the particular valving mechanism illustrated in the drawings.

I claim:

1. A valving assembly comprising a metal valve body having a recess therein, said recess having a circumferential side wall and a face having a substantially smooth surface, said recess defining an inlet chamber, said face being provided with a port leading through said valve body coaxially with said recess and leading to an outlet chamber and having a circular opening, a spherical metal valve having a radius of curvature less than any concave curvature of said surface, means for lifting said valve from said opening, means urging said valve into metal-to-metal line contact with said opening to form a chamber defined by said wall, face and valve sphere, and a non-metallic resilient ring between said face and said valve circumferentially retained about said opening by said wall and free to be deformed toward its center, said ring having a volume less than the volume of said last-mentioned chamber, a free coaxial dimension greater than the coaxial dimension of said last-mentioned chamber at the same distance from said opening, a free cross-sectional dimension in a plane parallel to said surface greater than one-half the difference between the diameter of said recess and the diameter of said valve sphere and when compressed between said valve and said face, an inner diameter exceeding the diameter of said opening, whereby upon engagement of said valve sphere and face, said valve sphere, ring and face define an unoccupied space between said ring and the line of contact between said port and said valve.

2. A valve mechanism comprising a metal valve body having a recess therein, said recess having a circumferential side wall and a face having a substantially smooth surface provided with a port leading through said valve body coaxially with said recess, and having a circular opening, a spherical metal valve having a radius of curvature less than any concave curvature of said surface, said valve, in a closed position, meeting said opening in metal-to-metal line contact to form a chamber defined by said wall, face and valve sphere and a non-metallic resilient ring between said face and said valve circumferentially retained about said opening by said wall and free to be deformed toward its center, said ring having a volume less than the volume of said chamber, a free coaxial dimension greater than the coaxial dimension of said chamber at the same distance from said opening, a free cross-sectional dimension in a plane parallel to said surface greater than one-half the difference between the diameter of said recess and the diameter of said valve sphere and when compressed between said valve and said face, an inner diameter exceeding the diameter of said port, whereby upon engagement of said valve sphere and face said valve sphere ring and face define an unoccupied space between said ring and the line of contact between said port and said valve.

References Cited in the file of this patent

UNITED STATES PATENTS

| | | |
|---|---|---|
| 302,585 | Pike | July 29, 1884 |
| 2,083,584 | Wineman | June 15, 1937 |
| 2,107,200 | Kennon | Feb. 1, 1938 |
| 2,456,084 | Ray | Dec. 14, 1948 |
| 2,574,054 | Miller | Nov. 6, 1951 |
| 2,654,560 | Smith | Oct. 6, 1953 |
| 2,676,782 | Bostock | Apr. 27, 1954 |
| 2,693,201 | Page | Nov. 2, 1954 |

FOREIGN PATENTS

| | | |
|---|---|---|
| 12,911 | Great Britain | of 1904 |